Nov. 10, 1931.  F. A. BERG  1,831,055
AIRCRAFT LINER
Filed April 9, 1928   7 Sheets-Sheet 1
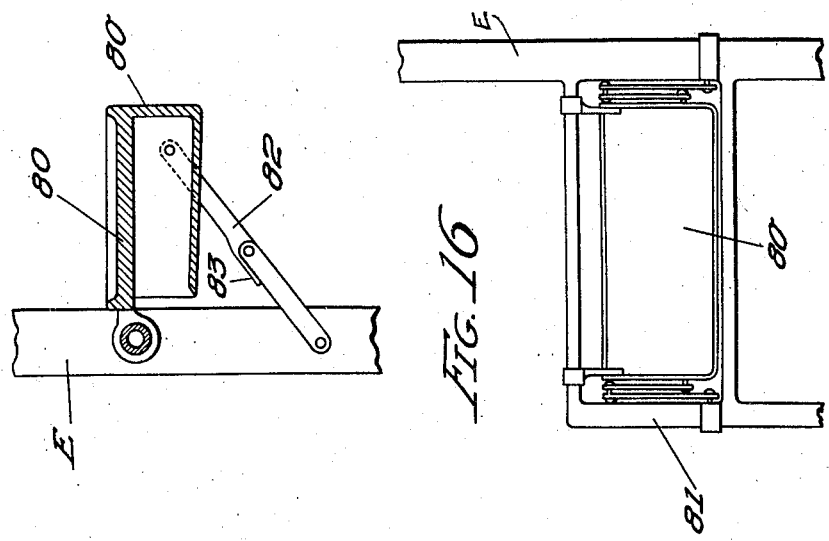
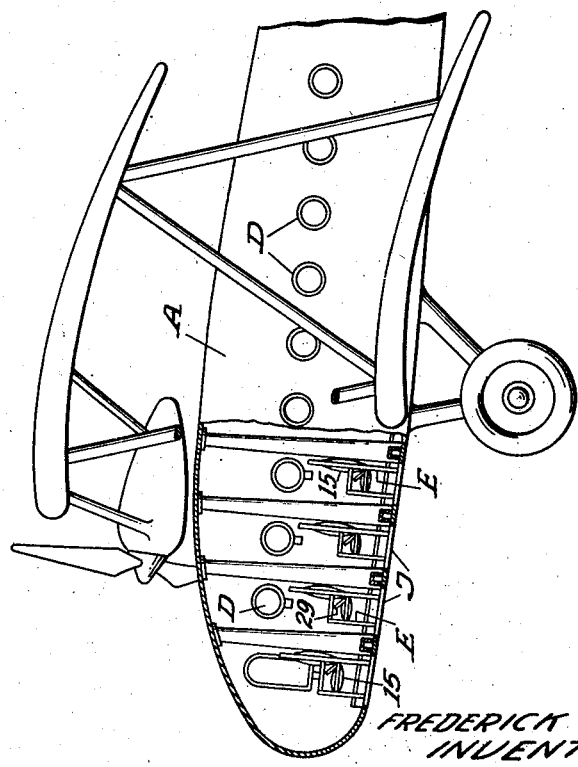
FREDERICK A. BERG
INVENTOR
PER
Albert J Fihe
ATTORNEY Nov. 10, 1931.  F. A. BERG  1,831,055
AIRCRAFT LINER
Filed April 9, 1928    7 Sheets-Sheet 2
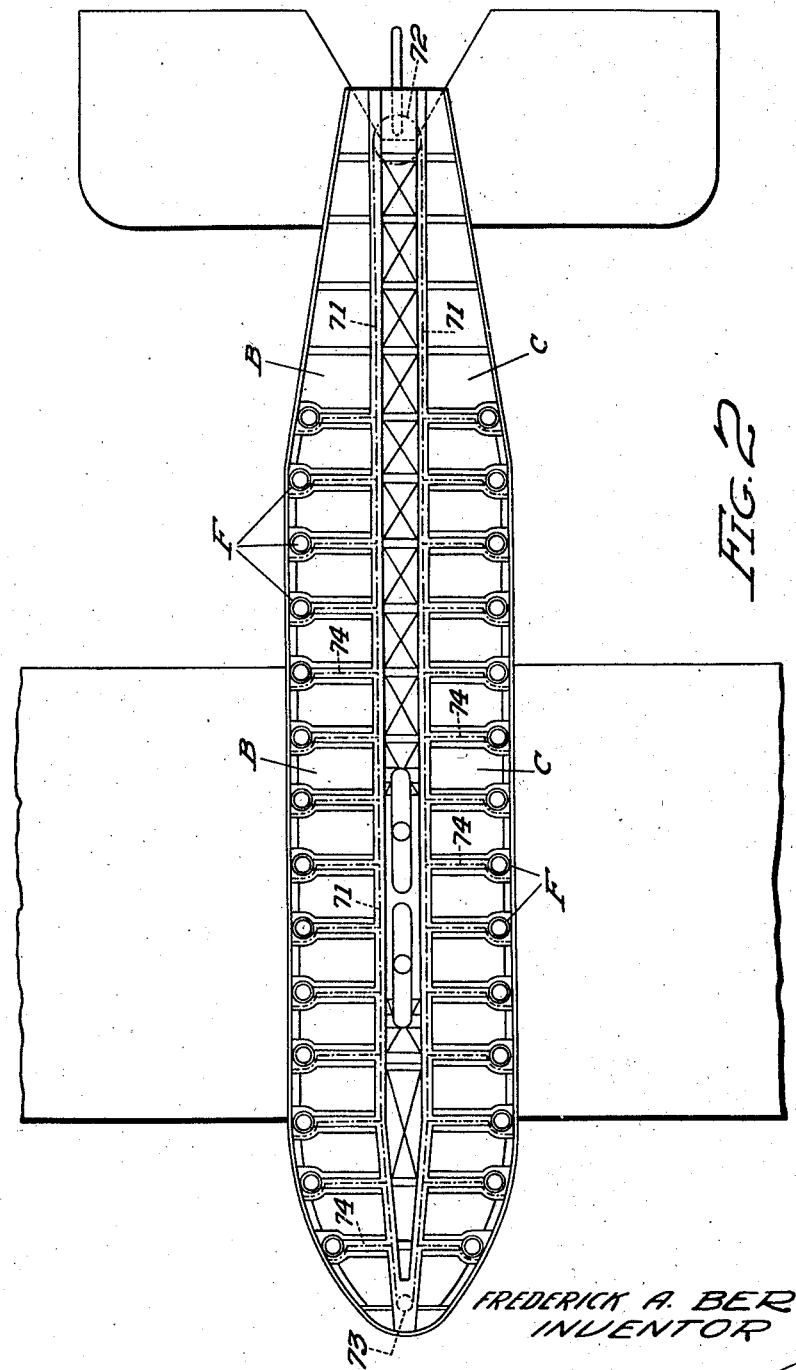

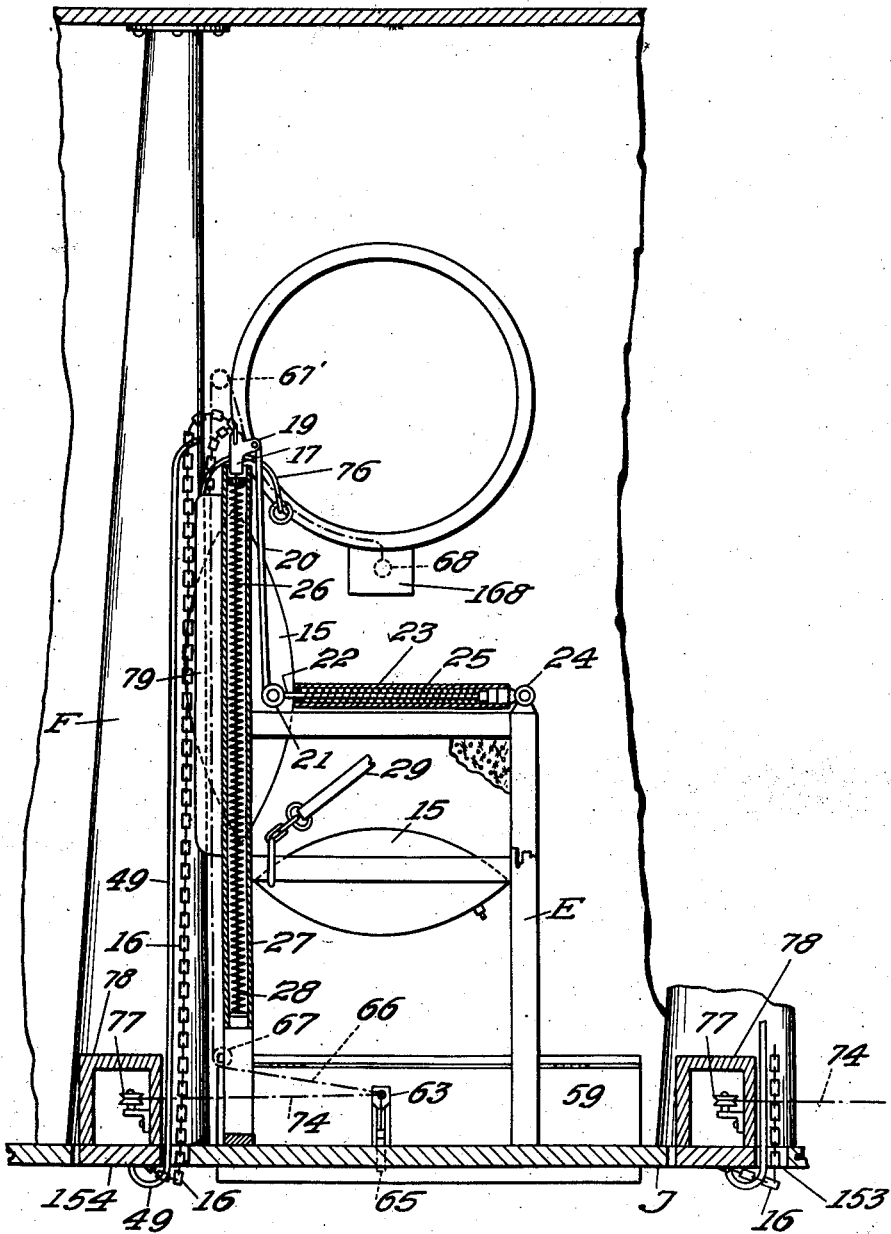

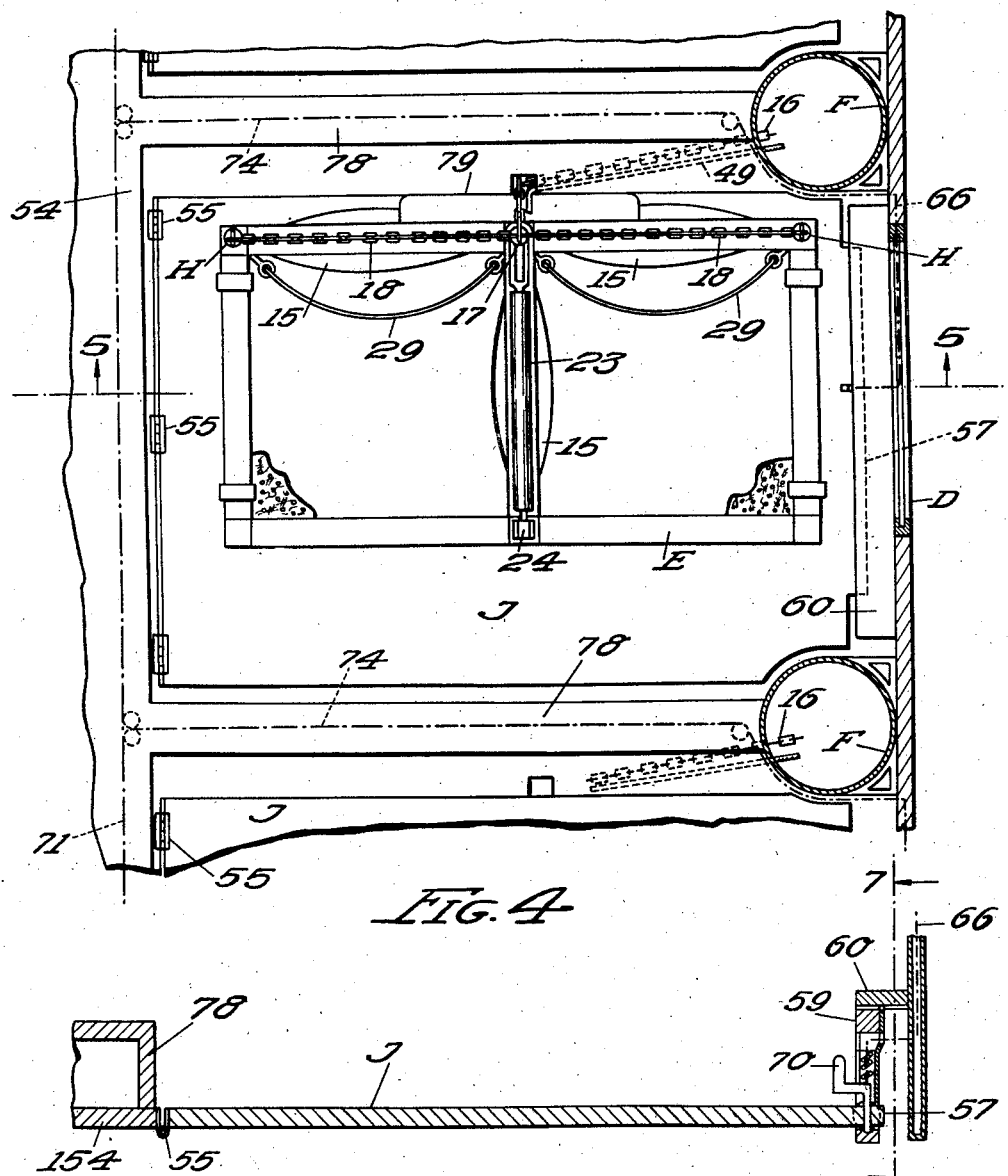

Nov. 10, 1931.  F. A. BERG  1,831,055
AIRCRAFT LINER
Filed April 9, 1928   7 Sheets-Sheet 5
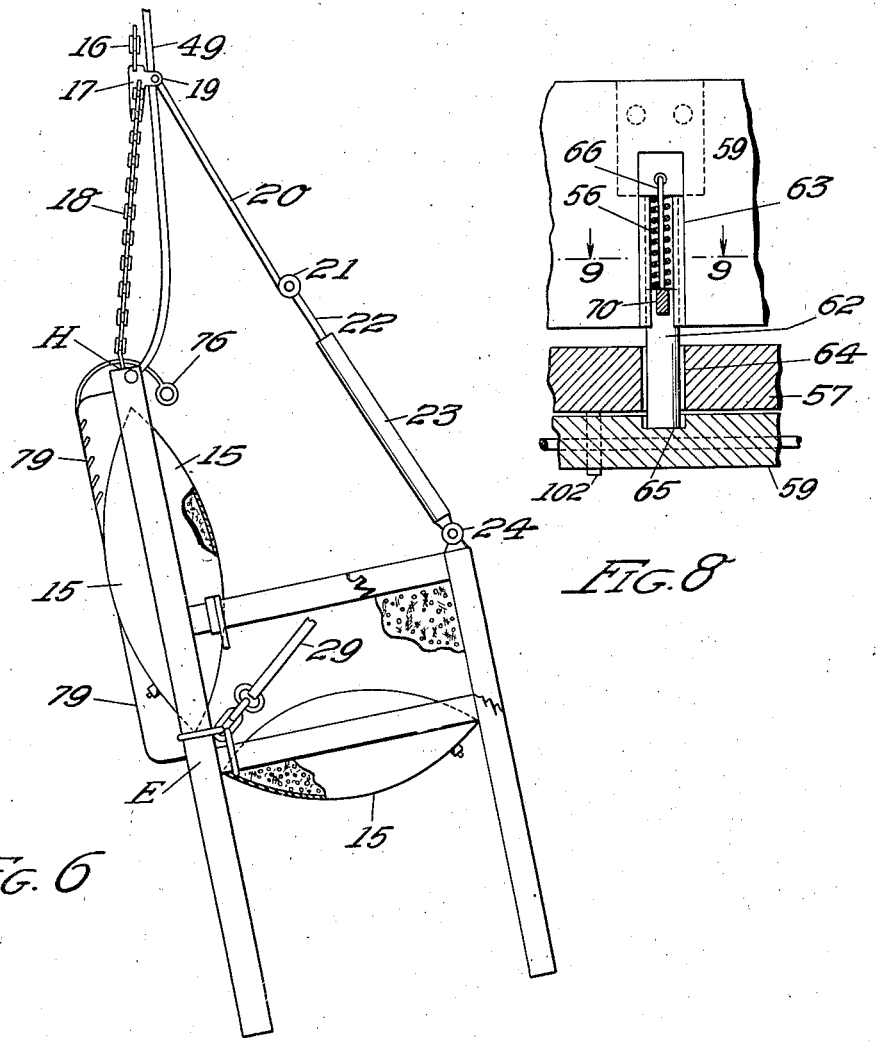
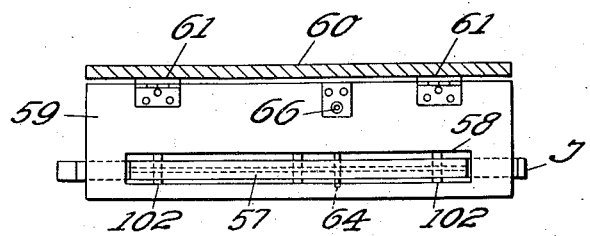
FREDERICK A. BERG
INVENTOR
PER
Albert J Fihe
ATTORNEY.

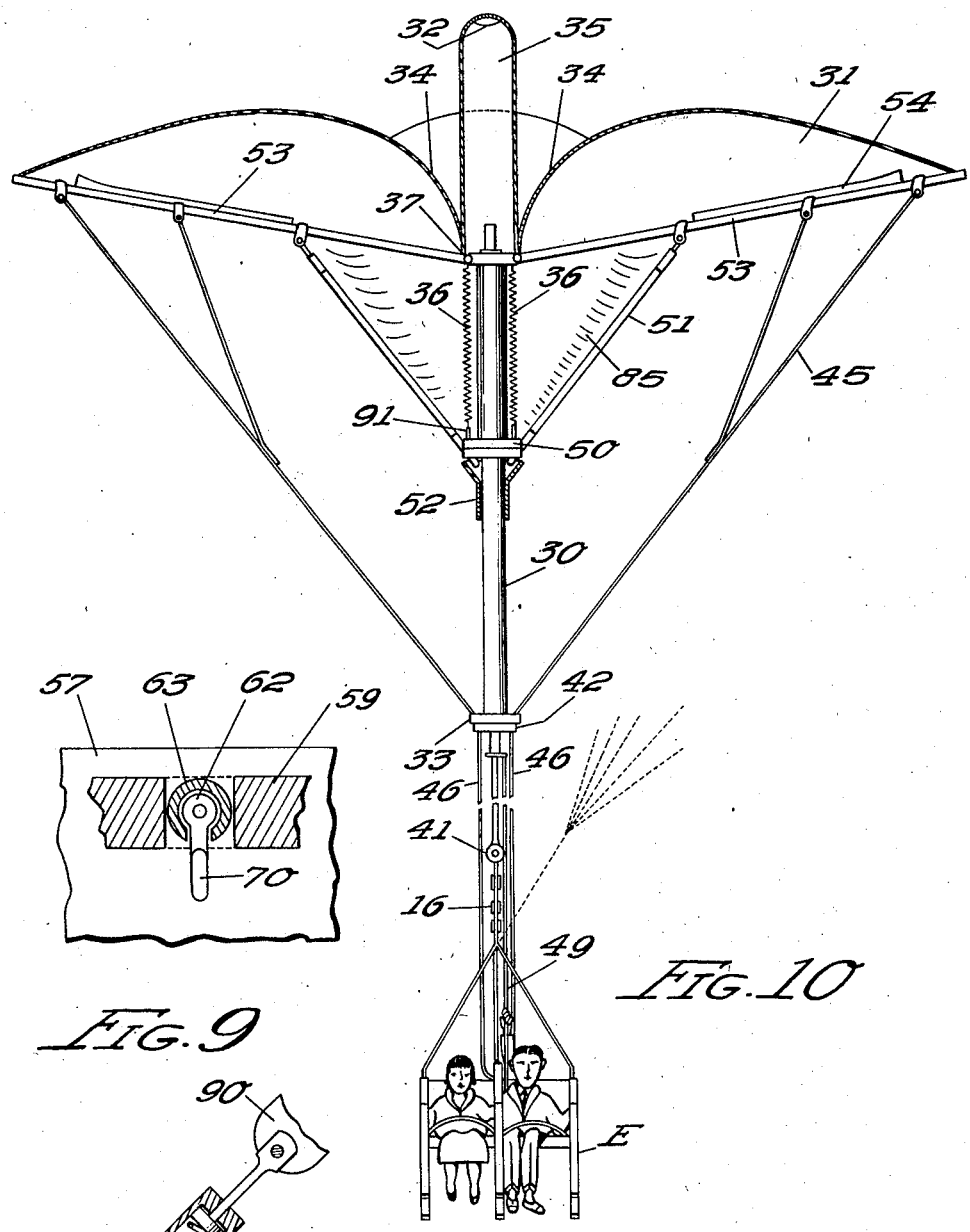

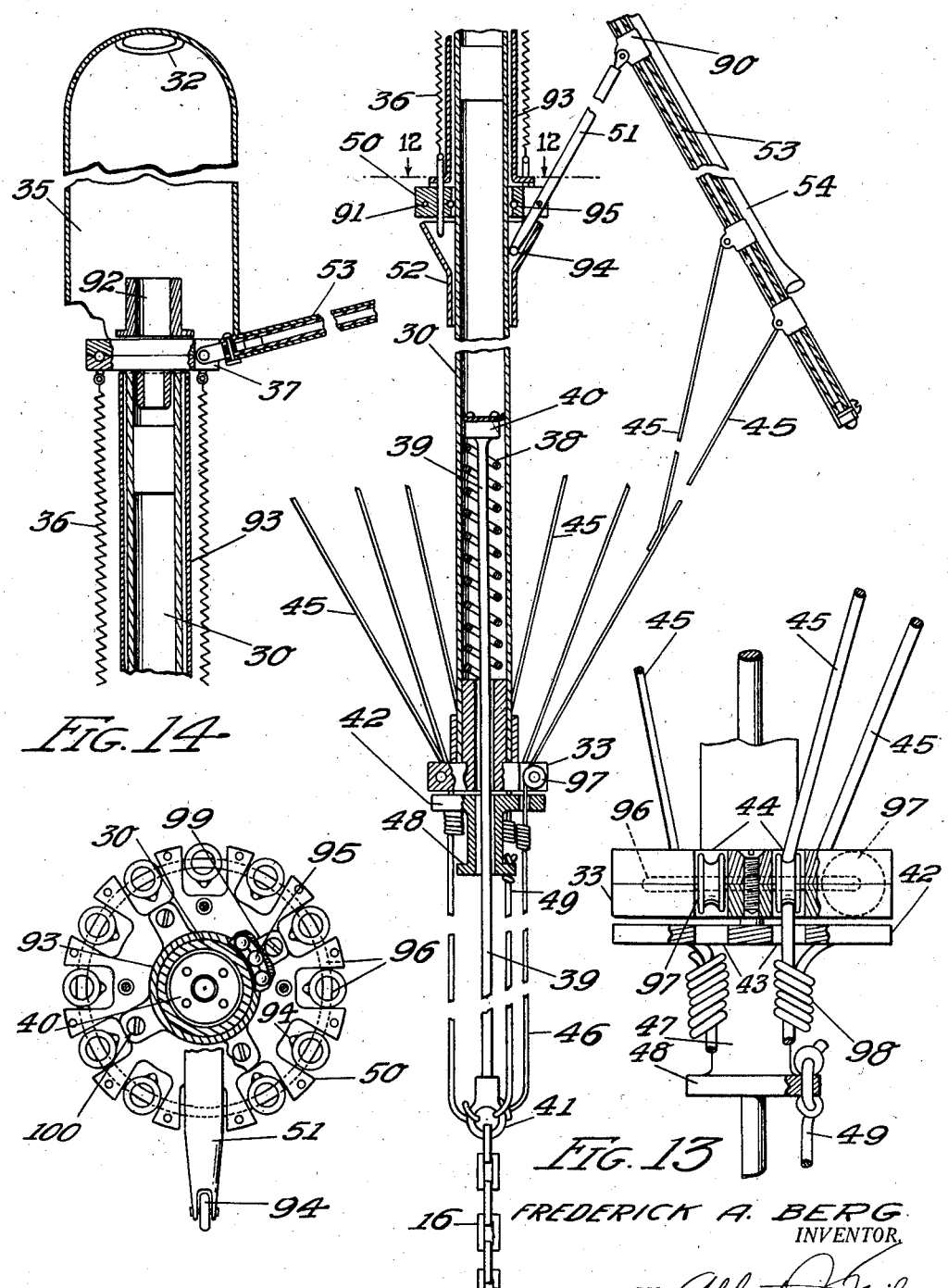

Patented Nov. 10, 1931

1,831,055

UNITED STATES PATENT OFFICE

FREDERICK A. BERG, OF CHICAGO, ILLINOIS

AIRCRAFT LINER

Application filed April 9, 1928. Serial No. 268,513.

My invention relates to new and useful improvements in aircraft liners, and especially relates to safety devices for the same, and has for its principal object the provision of an improved construction of this character which will be highly efficient in use and economical in manufacture.

A further contemplation of the invention is the provision of an aircraft liner having a number of passenger booths or compartments, each equipped with a chair mounted on a trap door and parachutes which are released by the individual passenger in times of danger or when occasion should arise.

A still further object of the invention and in direct connection with the parachute construction, is the provision whereby one or all of the parachutes carried by the aircraft can be released simultaneously through the medium of my selective means, by the pilot of the aircraft or by anyone else individually.

Another and still further object of the invention is the provision of a parachute for each passenger booth or compartment of an air liner which parachute is held in a tube arranged in one corner of each compartment, by friction and by a member connected to the chair of the compartment whereby the parachute will be brought into action when the chair is dropped into mid-air. This selective means of retaining the parachute in the tube until occasion requires for its use eliminates the necessity of employing a complicated arrangement of releasing mechanism for releasing the parachute.

Another contemplation of the invention is to provide a chair for each of the passenger compartments or booths of the aircraft, which is so constructed that should the same when landing, fall into water, the chair will be capable of floating until the passenger or passengers can be released from their position on the same.

Still another and further important object of the invention is to provide a mechanical parachute construction for use with airplanes which will automatically open whenever necessary and which further can be controlled by the user so as to determine to a great extent the place of landing. The parachute is further of a construction which will allow a positive control of the speed of descent.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevational view of a part of an aircraft liner embodying the invention;

Fig. 2 is a top plan view of the same;

Fig. 3 is a vertical sectional detail view of one of the passenger compartments or booths embodied in the invention;

Fig. 4 is a sectional plan view of the same;

Fig. 5 is a fragmentary sectional detail view of the trap door of a compartment taken substantially on line 5—5 Fig. 4;

Fig. 6 is a side elevational view of one of the chairs, embodied in the invention;

Fig. 7 is a sectional view taken substantially on line 7—7 of Fig. 5;

Fig. 8 is a sectional detail view of the trap door release mechanism embodied in the invention;

Fig. 9 is a sectional detail view taken substantially on line 9—9 of Fig. 8;

Fig. 10 is an elevational view of the parachute embodied in the invention, showing the same in operation;

Fig. 11 is a fragmentary detail view of the tubular staff of the parachute embodied in the invention;

Fig. 12 is a sectional detail view taken substantially on line 12—12 of Fig. 11, one element being displaced for clearness;

Fig. 13 is a side elevational view, parts being broken away, of the guy-line guides;

Fig. 14 is a detail sectional view of the top of the parachute;

Fig. 15 is a detail sectional view showing a cushioned plunger forming part of one of the parachute ribs;

Fig. 16 is a detail view of a portion of one of the chair arms;

Fig. 17 is a side view of the arms illustrating the disappearing receptacle feature.

Referring to the drawings, especially to

Figures 1 and 2, which illustrate the side elevational and top plan views of the aircraft liner embodied in the invention and in which A indicates an aircraft liner having opposite rows of compartments B and C for the accommodation of passengers, each space being provided with a window D and a chair E designed to accommodate two passengers. Each chair is positioned upon a trap door J. The specific construction of the chair E is such that in descending from the aircraft, by means of an attached parachute or the like, should the chair find for its landing place a body of water, the same will be capable of floating in an upright position until the passengers are rescued. In this connection and to accomplish this object I provide side walls, back rest and seat cushions each comprising an outer covering in the form of a pneumatic bag, as indicated at 15, which also, however, may be filled with cotton saturated in oil, silky vegetable fibres, or the like.

As best shown in Fig. 2, there is arranged in one corner of each of the compartments a tube F open at the bottom and adapted to house an improved parachute indicated in Fig. 10, and which is connected to the chair of the respective compartment by a suitable chain 16 frictionally held in inoperative position by the trap door.

The means (Figs. 3 and 4) for connecting the parachute to the chair comprise a suitable chain member 16, as shown, one end of said chain member being connected to a link 17 which in turn is connected to diverting chain members 18 having their opposite ends connected to the respective ends of the back rest of the chair as indicated at H. Carried by the link member 17 is a lateral projection connected to one end of an arm 20 which in turn is pivotally connected, as at 21, to a piston rod 22 mounted in a cylinder 23 pivotally mounted on the central arm rest of the chair as at 24. A compression spring 25 is mounted to embrace the piston rod 22 within the cylinder 23 to normally hold the piston rod in the position shown in Fig. 3.

The link member 17 is also connected to a cable 26, as shown, mounted in a hollow portion 27 in the back rest of the chair E, said cable also being controlled by a compression spring 28. This construction is such that when the chair is suspended in mid-air it will be tilted in the manner illustrated in Fig. 6. Also by the provision of the compression springs 25 and 28, in connection with the chain supports of the chair, when the chair drops through the trap door, upon release of the same, the force of the drop of the chair will be broken thus preventing a sudden jerk as would otherwise be the case. The opposite end of the chain 16 is connected to the parachute.

Carried by each of the chairs is a safety belt 29 through the medium of which the passenger is enabled to strap himself to the chair.

Referring now to Figs. 9 to 13 inclusive illustrating the preferred form of construction of the parachute embodied in the invention, 30 indicates a tubular staff carrying superposed sustaining elements 31 at its upper end and at its lower end a fixed collar 33 of split construction having a plurality of pulley wheels or rollers 97 for the operation of cables 45. In this connection the modification of the present invention consists in the formation of central depressed portions 34 in each compartment round the upper end portion of the staff 30 and at this end of the staff a fabric vacuum bag 35 is mounted. The purposes of these modifications are such that the velocity of the descent is checked when the parachute is in operation owing to the vacuum created in the depressed portions 34 and air pressure in the vacuum bag 35. The sustaining elements are air tight, thus forming a complete vacuum operated parachute. An automatically adjustable circular extensible or resilient sling 32 operative in the opening and closing of the parachute is positioned at the uppermost end of the vacuum bag 35. In the present construction I also provide expansion spring slings 36 which are connected to a fixed collar 37 carried by the staff 30, the purposes being such that the expansion springs will have a tendency to assist in opening the parachute when brought into action.

A conical cup 52 slides freely on the staff 30 and has at its upper end a collar 50. Pins or rods 91 are mounted in the cup, and pass through the collar and at the upper ends of the pins 91 are connected the lower ends of the springs 36. Stays 51 are provided joining the staff 30 to the fabric supports, and a telescopic connection is provided at the end of each rod or stay 51, where it is pivotally attached to a collar 90 on the tube or brace 53. This provides a slight lost motion allowing additional resiliency, as shown in Fig. 15.

A securing element 92 is threadedly mounted in the upper end of the tube 30, and retains the collar 37 in desired position.

Carried by the staff 30 and controlled by a compression spring 38 is a suitable cable 39 passing through a central opening formed in the fixed collar 33, the outer end of said cable carrying a ring member 41 through the medium of which the cable 39 is connected to the end of the chain 16. The provision of the spring controlled cable 39 is such that when the chair is dropped into mid-air the force of the drop will be resisted by the spring 38. A frictionally held air tight element forms a plug piston 40 in the tube 30 which also assists the spring by air compression.

The ring 50 which surrounds the tubular shaft 30 is shown in detail in Fig. 12 and comprises essentially a sleeve 93 slidably fitted over the tube 30 and having integral outwardly extending lugs or lips 99 in each of which is mounted a collar screw 100. These, in turn, support in proper operating position a series of ball bearings 95 which permit of a very ready sliding of the ring on the tubular shaft 30. Anti-friction wheels 94 are mounted in the ends of the stays 51.

The ring or collar 33 is fixedly mounted on the tubular shaft 30 and has adjacent the periphery thereof and mounted therein by means of a split construction an annular ring 96 which serves as an axial or operating support for anti-friction wheels 97 as best shown in Fig. 11. A cable 45 is adapted to ride over each of the anti-friction wheels 97, and it will be noted that there are twelve cables, but after each adjacent pair of cables passes over a corresponding pair of adjacent anti-friction wheels 97, the ends of each pair of cables are spliced as shown at 98 in Fig. 13 for convenient connection to the opposite supporting and operating elements 47 and 48. In this way, the number of connections between the cables 45 and the operating element 47 is diminished by one-half without in any way impairing the efficiency of the operation of the structure.

In addition to the objects enumerated herein it is my object to provide means for controlling the descent of the parachute and for guiding the parachute in its course of descent. This means comprises a slidable collar 42 provided with a plurality of radially disposed openings 43 registering with openings 44 formed in the fixed collar 33 and through which the flexible stay-wires 45 pass, said stay-wires being united together in pairs and connected to individual controlling cables 46 which extend down to the chair E within easy reach of the passenger therein. This construction in such that by pulling on one or more of the controlling cables 46 the parachute will be caused to tilt and thus change its course in descent.

The controlling cables 46 may be operated manually or a suitable mechanism of any approved type may be mounted on the chair in a convenient location for the purpose. Formed on the collar 42 is a hub 47 having a lateral flange 48 to which a main control cable 49 is anchored. The purpose of the main control cable 49 is such that by pulling downwardly on this cable the diameter of the parachute will be increased and the velocity of descent will be thus decreased and it is apparent that by increasing or decreasing the diameter of the parachute the velocity of descent can be governed accordingly. The cable 49 extends down to the chair E within easy reach of the passengers and can be either manually operated or operated by suitable mechanism mounted on the chair in a convenient location for the purpose.

Folding of the parachute when the same is to be inserted in the tube F is facilitated by the collar 50 slidably mounted on the staff 30 and to which are anchored the hollow tubing or stays 51 plugged at each end to provide strength and buoyancy.

These tubes 51 are hingedly mounted at their upper ends to dihedral braces 53 forming lateral buoyant supports for the sustaining fabric 31. These braces 53 also comprise hollow tubes plugged at each end for lightness, strength, and buoyancy. A pocket 54 is provided adjacent each member 53 for the reception of the cable 45 when the parachute is in folded position, thereby preventing tangling. A fabric 85 connects the braces or stays 51 forming a pocketed or concave compartment between each pair of braces, and thereby providing a conical stabilizer.

As has already been stated, the parachute, when in collapsed position, is held in the tube F by friction owing to its tendency to expand, and the chain 16 is passed through a narrow slot 153 formed in the floor 154 of the compartment to which the parachute belongs. It will be seen by inspecting Fig. 3 that the chain 16 being suspended from the top of the chair and connected to the bottom of the parachute staff will retain the parachute in such position, as illustrated, until the chair drops into mid-air at which time the parachute will be pulled out of the tube F by such dropping of the chair.

The trap door J is hingedly mounted to the floor 154 by suitable hinge members 55 as best shown in Fig. 4. The end of the trap door J is provided with a lateral tongue 57 which passes into a slot 58 formed in partition 59 which is hingedly mounted to a member 60 an applicable distance above the floor formed by the trap door, by suitable hinges 61 as best shown in Figs. 5 and 7. The purpose of the lateral projection 57 which engages the slot 58 is such that should the locking mechanism fail to hold the trap door in closed position, the partition 59 will prevent springing of the trap door until the lateral projection 57 is drawn free from the solt 58 by means which will also hereinafter be set forth.

The locking mechanism comprises a plunger 62 reciprocally mounted in a metallic sleeve 63 carried by the partition 59, the plunger 62 being adapted to pass through an opening 64 formed in the lateral projection 57 and into a socket 65 formed in the lower portion of the partition 59.

A compression spring 56 surrounds the plunger 62 affording more positive operation. As long as the plunger 62 is in the position illustrated in Fig. 8 the trap door will be locked in closed position and prevented from collapsing. Fixedly secured to the plunger 62 is an operating cable 66 which extends over rollers 67 and 67', (Fig. 3) to a convenient location indicated by a ring at 68 within easy reach of the passenger. Normally the ring 68 is covered by a flap 168. In times of danger, the passenger by pulling the member 68, will disengage the plunger 62 from the recess 65 and opening 64 and the partition 59 will be caused, by such pulling, to swing away from the trap door J, thus permitting the door to drop letting the chair E drop into mid-air. It will be noted that the outer edge of the trap door J has fitted thereon a plurality of anti-friction wheels 102 as best shown in Figure 7 whereby a ready release of the door from its connection with the member 59 will be promptly accomplished as a weight of even 300 or 400 pounds on the door will not be sufficient to cause sticking friction when the rollers or wheel bearings 102 are used. As the chair E thus drops and the slack of the chain 16 is completely taken up, the removal of the parachute from the tube F will thus be accomplished by the dropping of the chair, and as the chair and parachute start a downward course the parachute will automatically open with the assistance of the expansion springs 36. In connection with the releasing mechanism of the trap door, I provide a lateral projection 70 (Fig. 9), which enables any passenger to release a trap door should at any time he be unable to reach or control the member 68 to effect such release of the drop.

While I have described the construction of the chair, parachute, and releasing mechanism for the trap door for one compartment, the same construction applies to each and every compartment of the aircraft A.

I also provide means whereby all of the trap doors can be released simultaneously by anyone of the passengers or by the operators of the aircraft, this being accomplished by extending a wire member or cable 71 around pulleys 72 and 73 (Fig. 2) and by connecting a wire member 74 with each of the plungers 62.

By this arrangement a passenger or one of the operators of the aircraft liner can cause the release of all the trap doors by manually pulling the cable 71 in either direction. The cables 74 pass around supporting pulleys 77, and the entire mechanism is mounted in a housing 78, to avoid accidental interference.

For the convenience of the individual passenger if desired, an emergency pack parachute 79 of comparatively large size can be mounted on the chair. When such is the case the parachute 79 is mounted on the back of the chair and is operated by a suitable pull 76. as illustrated in Fig. 3.

A combination shelf and pocket is provided on each chair as shown at 80. This comprises a drop table hingedly mounted on the outside arm 81 of each chair. A collapsible bracket 82 is provided to support the table or shelf, and the bracket includes a flange 83 to prevent collapse. This shelf can be used for serving meals, or for similar purposes, and when in forward position forms a pocket for the reception of small articles, such as books, toilet articles, etc.

By referring to the drawings and the description herein the operation of the invention is obvious and it will be seen that I accomplish all objects herein enumerated together with other objects which can be clearly seen from the description herein stated and by inspection of the drawings.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In an aircraft liner, the combination of a plurality of compartments, a chair releasably arranged in each of said compartments; a tube open at one end arranged in each of said compartments; a safety device arranged in said tube and connected with said chair; means for releasing said chair to bring said safety device from said tube and to permit said chair to drop free from said aircraft to bring said safety device into operation; and means associated with said chair adapted to resist the shock imparted to said safety device when said chair drops free from said aircraft, said means comprising coiled compression springs and air valve.

2. In an aircraft liner, the combination of a plurality of compartments, a chair releasably arranged in each of said compartments; a tube open at one end arranged in each of said compartments; a safety device arranged in said tube and connected with said chair; means for releasing said chair to bring said safety device from said tube and to permit said chair to drop free from said aircraft to bring said safety device into operation; and means associated with said chair adapted to resist the shock imparted to said safety device when said chair drops free from said aircraft, said means comprising pneumatic tubes.

3. A safety device for aircraft comprising, in combination, a parachute having a central hollow staff, and flexible stay wires, anti-friction rollers, a spring controlled supporting member associated with said staff; a chair carried by said supporting member; and means mounted to slide on said supporting member and connected to the flexible stay wires of said parachute for decreasing the diameter of said parachute to increase and operate the velocity of descent.

4. A safety device, comprising in combination, a parachute having a central tubular staff; and flexible stay wires; a collar at one of said staff; a supporting cable associated with said staff; a chair carried by said cable; a collar mounted to slide on said supporting cable, there being radially disposed openings in said collar registering with radially disposed openings formed in said first named collar for the pasage of the flexible stay wires of said parachute; and controlling cables connected to said wires whereby said parachute can be tilted by downward pulling of said controlling cables to direct the course of descent of said parachute.

5. A safety device, comprising, in combination, a parachute having a central tubular staff and flexible stay wires; a collar at one end of said staff; a supporting rod associated with said staff; a chair carried by said rod; a collar mounted to slide on said supporting rod, there being radially disposed openings in said last-named collar registering with radially disposed openings formed in said first named collar for the passage of the flexible stay wires of said parachute; and a controlling cable anchored to said slidable collar affording means for moving said slidable collar to increase or decrease the diameter of said parachute.

6. In an aircraft liner, a plurality of compartments; a chair releasably arranged in each of said compartments; a parachute associated with said chair; a trap door for supporting said chair, a lateral projection formed on one end of said trap door; a hingedly mounted partition, an elongated slot formed in the side of said partition for the reception of said lateral projection for retaining said trap door in position for supporting said chair; and means for swinging said partition to disengage said projection from said slot to permit dropping of said trap door to release said chair from said compartment and bring said parachute into operation.

7. A safety device, comprising a chair having its back rest and seat in the form of an inflated bag and a parachute associated with said chair, means for automatically opening the parachute when the chair is dropped, and means for directing the course of the descent of the chair and parachute, said means comprising hinged stays in the parachute, individual shrouds attached to adjacent stays, and a series of stay wires and cables for controlling the angular position of the stays and shrouds with respect to the parachute and to each other.

8. In an aircraft liner, the combination of a plurality of compartments, a chair releasably arranged in each of said compartments; a tube open at one end arranged in each of said compartments; a safety device arranged in said tube and connected with said chair; means for releasing said chair to bring said safety device from said tube and to permit said chair to drop free from said aircraft to bring said safety device into operation; and means associated with said chair adapted to resist the shock imparted to said safety device when said chair drops free from said aircraft, said means comprising a central hollow staff for the parachute and a coil spring in the said staff.

9. In an aircraft liner, the combination of a plurality of compartments, a chair releasably arranged in each of said compartments; a tube open at one end arranged in each of said compartments; a safety device arranged in said tube and connected with said chair; means for releasing said chair to bring said safety device from said tube and to permit said chair to drop free from said aircraft to bring said safety device into operation; and means associated with said chair adapted to resist the shock imparted to said safety device when said chair drops free from said aircraft, said means comprising a central hollow staff for the parachute and a coil spring in the said staff, means plugging the ends of the said central staff, and a piston operating in the staff in conjunction with said spring.

10. In a parachute a hollow central staff, stays hingedly attached thereto, a stay supporting collar slidably mounted on the staff and a spring resiliently supporting the same thereon, stay rods connecting the collar to the stays and supporting surfaces connecting each associated pair of stays together with a central conical supporting and directing surface attached to the stay rods and adapted for deflecting the upward currents of air and thence inwardly in eddies beneath the top supporting surfaces.

11. In a parachute a hollow central staff, stays hingedly attached thereto, a stay supporting collar slidably mounted on the staff, stay rods connecting the collar to the stays and supporting surfaces connecting each associated pair of stays together with a central conical supporting and directing surface attached to the stay rods and adapted for deflecting the upward currents of air and thence inwardly in eddies beneath the top supporting surfaces, and a collapsible automatically operated valve in the center of the parachute attached to the top of said hollow staff.

12. A safety device, comprising in combination, a parachute having a central tubular staff; and flexible stay wires; a collar at one end of said staff; a supporting rod associated with said staff; a chair carried by said rod; a collar mounted to slide on said supporting rod, there being radially disposed openings in said collar registering with radially disposed openings formed in said first named collar for the passage of the flexible stay wires of said parachute; and controlling cables connected to said wires whereby said parachute can be tilted by downward pulling of said controlling cables to direct the course of descent of said parachute, and anti-friction elements in the radially disposed openings in the collar for the operation of the cables thereon.

13. A safety device, comprising, in combination, a parachute having a central tubular staff and flexible stay wires; a collar at one end of said staff; a supporting rod associated with said staff; a chair carried by said rod; a collar mounted to slide on said supporting rod, there being radially disposed openings in said collar registering with radially disposed openings in said first named collar for the passage of the flexible stay wires of said parachute; and a controlling cable anchored to said slidable collar affording means for moving said slidable collar to increase or decrease the diameter of said parachute, the said collar being of split construction, an annular axle element mounted inside the periphery of the collar and pulley wheels on the said annular axle element.

14. A safety device comprising, in combination, a parachute having a central tubular staff and flexible stay wires; a collar at one end of said staff; a supporting rod associated with said staff; a chair carried by said rod; a collar mounted to slide on said supporting rod, there being radially disposed openings in said collar registering with radially disposed openings in said first named collar for the passage of the flexible stay wires of said parachute; and a controlling cable anchored to said slidable collar affording means for moving said slidable collar to increase or decrease the diameter of said parachute, the said collar being of split construction, an annular axle element mounted inside the periphery of the collar and pulley wheels on the said annular axle element, said pulley wheels being disposed in radial openings in the collars.

15. In an aircraft liner, a plurality of compartments; a chair releasably arranged in each of said compartments; a parachute associated with said chair; a trap door for supporting said chair, a lateral projection formed on one end of said trap door; a hingedly mounted partition, an elongated slot formed in the side of said partition for the reception of said lateral projection for retaining said trap door in position for supporting said chair; and means for swinging said partition to disengage said projection from said slot to permit dropping of said trap door to release said chair from said compartment and bring said parachute into operation, and anti-friction means in the trap door for operation with said partition.

In testimony whereof I affix my signature.

FREDERICK A. BERG.